United States Patent [19]

Kupper et al.

[11] Patent Number: 4,612,205

[45] Date of Patent: Sep. 16, 1986

[54] CARBONATED JUICE BEVERAGE WITH COLA TASTE

[75] Inventors: Philip L. Kupper; Marsha W. Shields, both of Cincinnati, Ohio

[73] Assignee: Procter & Gamble Company, Cincinnati, Ohio

[21] Appl. No.: 720,439

[22] Filed: Apr. 4, 1985

[51] Int. Cl.$^4$ ............................................... A23L 2/02
[52] U.S. Cl. .................................... 426/599; 426/590
[58] Field of Search .................... 426/590, 599, 330.3, 426/477, 330.5

[56] References Cited

U.S. PATENT DOCUMENTS 3,632,354  1/1972  Swaine .............................. 426/590
3,886,297  5/1975  Parliment et al. .
4,061,797  12/1977  Hannan, Jr. et al. ............... 426/590

FOREIGN PATENT DOCUMENTS 211489  11/1982  Fed. Rep. of Germany ...... 426/599

OTHER PUBLICATIONS

Gardner, 1966, Food Acidulants, Allied Chemical Corp., New York, pp. 97–107.
Cruess, 1948, Commercial Fruit and Vegetable Products, McGraw-Hill Book Co., New York, pp. 343 and 344.
Woodroof et al, 1974, Beverages: Carbonated and Noncarbonated, AVI Publishing Co., Inc., Westport, CT, pp. 44–46, 170–176, 368–369.
Woodroof et al, 1975, Commercial Fruit Processing, AVI Publishing Co., Inc., Westport, CT, pp. 252–255.
Desrosier, 1977, Elements of Food Technology, AVI Publishing Co., Westport, CT, pp. 656–665.
Nelson et al, 1980, Fruit and Vegetable Juice Processing Technology, AVI Publishing Co., Westport, CT, pp. 470–473, 482–485, 526–531.
Beattie, G. B., "Soft Drink Flavours, Their History and Characteristics, Part I. Cola or 'Kola' Flavours", The Flavour Industry, Jun. 1970, pp. 390–394.
Jacobs, M. B., Manufacture and Analysis of Carbonated Beverages, Chemical Pub. Co., New York, NY, 1959, pp. 130–135, 159–161, 234–235.
Noling, A. W., "Beverage Flavoring Materials", Beverage Production and Plant Operation, National Soft Drink Assoc., Washington, D.C., 1967, pp. 9, 19–27.

*Primary Examiner*—Raymond N. Jones
*Assistant Examiner*—Carolyn Paden
*Attorney, Agent, or Firm*—Eric W. Guttag; Rose Ann Dabek; Richard C. Witte

[57] ABSTRACT

This invention relates to a storage-stable carbonated beverage containing fruit, citrus, or berry juice which has the taste of a cola. No kola nut extract, or caramel color is present. One or more juices, in particular plum juice, alone or mixed with other suitable juices, is employed to provide the taste of a cola without the use of kola nut extract. The beverage comprises carbonated water, juices, acid, and natural flavorings. No artificial cola flavorings are employed.

23 Claims, No Drawings

CARBONATED JUICE BEVERAGE WITH COLA TASTE

TECHNICAL FIELD

This invention relates to beverage products, specifically to a carbonated beverage containing juice which has the taste of a cola.

BACKGROUND OF THE INVENTION

The popularity of commercial carbonated soft drinks has increased phenomenally in recent years. Cola-type soft drinks are especially popular and characteristically contain carbonated water, sweetener, kola nut extract, caramel coloring, phosphoric acid, and a blend of flavorings. Cola flavoring is known as a complex flavor mixture, and typically contains kola nut extract, citrus characteristics such as lemon, orange or lime, spice characteristics such as cassia or clove, and vanilla. It is also known in the art to employ lime juice as a component of cola flavoring, primarily for its contribution of lime flavor.

Due to the popularity of cola-type carbonated soft drinks, an improved nutritional profile for this type of beverage would be beneficial. However, nutrient fortification of this type of beverage may not be popular because consumers desire nature products without additives. A beverage with cola taste and an improved nutritional profile and without the negatives of empty calories, and added coloring is needed. It is desirable for consumers to have available a carbonated cola-type beverage having the nutritional advantages of juice.

U.S. Pat. No. 4,061,797 of Hannan, Jr. et al., issued Dec. 6, 1977 discloses a noncarbonated beverage containing cola flavoring and fruit juice or fruit flavoring. The fruit flavor is pronounced with respect to the cola flavor. The fruit juice or flavoring is employed to improve the flat beverage flavor due to lack of carbonation. When fruit juices are employed instead of fruit flavorings, this beverage has the nutritional benefits derived from juices, but contains caffeine, cola flavoring and caramel coloring. Thus, the cola-related negatives are not eliminated.

U.S. Pat. No. 3,632,354 of Swaine et al., issued Jan. 4, 1972 discloses a dry powder composition suitable for blending with heated water to repare a hot cola beverage. This hot cola-flavored beverage contains caramel coloring, and cola flavoring. It is desirable for consumers to have available a carbonated beverage with the popular taste of cola but without the empty calories and added coloring of current cola beverages.

It is therefore an object of the present invention to provide a carbonated beverage containing juice which has the taste of a cola.

It is a further object of the present invention to provide a carbonated beverage which tastes like a cola containing the nutritional advantages of the presence of fruit, berry, or citrus juices.

It is a further object of the present invention to provide a carbonated beverage with the flavor of a cola without the use of kola nut extract.

It is a further object of the present invention to provide a carbonated beverage with the flavor of a cola which contains no added coloring of any kind.

These and other objects of the invention will become obvious from the following descriptions and examples.

DISCLOSURE OF THE INVENTION

This invention relates to a storage-stable carbonated beverage containing fruit, berry, or citrus juice which has the taste of a cola. No kola nut extract or caramel color is present. One or more juices, in particular plum juice, alone or mixed with other suitable juices, is employed to provide the taste of a cola without the use of kola nut extract. The beverage comprises carbonated water, juices, acid, and natural flavorings. No artificial cola flavorings are employed.

DESCRIPTION OF PREFERRED EMBODIMENTS

The constitution of the composition of the beverage of the present invention can vary to a certain extent depending upon the juices employed, so that the flavor of the beverage will be typical of a cola beverage. In general the beverage comprises water, fruit, berry, or citrus juices, acid, and natural flavorings. A sweetener can be added if there is insufficient sweetness from the juices. Carbonation in the form of carbon dioxide is added for effervescence. A preservative can be added if necessary. Caffeine can be added as an optional ingredient.

Juices suitable for use in the present invention include primarily citrus, fruit or berry juices. Juices can be employed in the present invention in the form of a concentrate, puree, single-strength juice, or other suitable forms. The term "juice" as used herein denotes single-strength fruit, berry, or citrus juices, as well as concentrates, purees, milks, and other equivalent forms. It has now been found that plum juice in particular is especially suitable for use in preparing a beverage having the taste of a cola. Plum juice is organoleptically compatible with the unique taste of cola, and can be combined with other juices and flavorings to generate a beverage having the flavor of cola. Other examples of suitable juices to replace a portion of the plum juice, include prune, date, currant, fig, or raisin.

Another juice especially suitable for use as an optional component of the beverage of the present invention in addition to the above juices is cranberry juice. Cranberry juice imparts tartness to the overall flavor of the beverage. The combination of plum and cranberry juices with citrus, ginger, vanilla, and spice flavorings creates the taste of a cola. One or more other suitable juices can be used in place of cranberry juice. Appropriate juices include blueberry, blackberry, raspberry, cherry, currant, dewberry, loganberry, boysenberry, strawberry, grape, elderberry, lingonberry, quince, buckthorn, sloe, rowan, gooseberry, pomegranate, or persimmon.

An optional additional juice component of the beverage of the present invention comprises one or more juices light in color to increase the juice content of the beverage without adversely affecting beverage color and flavor. Examples of such juices include apple, pear, pineapple, peach, lemon, lime, orange, apricot, grapefruit, tangerine, rhubarb, cassis, quince, passionfruit, papaya, mango, guava, litchi, kiwi, mandarin, coconut, and banana. Deflavored and decolored juices can be employed if desired. Preferred for use in the beverage of the present invention is apple juice.

In the beverage of the present invention, juice is present at a level of from about 0.2% to about 30% by weight of the beverage, preferably from about 1% to about 20% by weight. Of this total juice content, plum juice comprises from about 50% to about 100%, which is equal to about 0.1% to about 30% by weight of the beverage. The optional juice imparting tartness such as cranberry comprises from about 0.05% to about 20% by weight of the total juice present, which is equal to about 0.0001% to about 6% by weight of the beverage. The optional lighter colored juice comprises from about 0.1% to about 30% by weight of the total juice present, which is equal to about 0.0002 to about 9% by weight of the beverage.

Water is a basic ingredient in soft drinks since it is the vehicle or liquid portion in which the remaining ingredients are dissolved or dispersed. Purified water is used in the manufacture of soft drinks and the beverage of the present invention. Water of a standard beverage quality is required in order not to adversely affect beverage taste, odor, or appearance. The water must be clear, colorless, free from objectionable minerals, tastes and odors, free from organic matter, low in alkalinity and of acceptable microbiological quality based on industry and government standards. Water is present in the beverage at a level of from about 80% to about 99.9% by weight of the beverage.

Various sweeteners are suitable for use in the beverage of the present invention if insufficient sweetness is derived from the juices present. Natural crystalline or liquid sweeteners such as sucrose, fructose, glucose, levulose, high fructose corn syrup, invert sugar and others can be used. To achieve the desired beverage uniformity, texture, and taste, standardized liquid sugars as are commonly employed in the beverage industry can be used. These are free of traces of nonsugar solids which could adversely affect the flavor, color or consistency of the beverage. Artificial or non-nutritive sweeteners are also suitable for use in the present invention. Such sweeteners include saccharin, cyclamate, aspartame, other dipeptides, acesulfame potassium, and others. Natural sweeteners are present in an amount of from about 0.1% to about 25% by weight of the beverage, preferably from about 10% to about 14% by weight. Non-nutritive sweeteners are employed at a level of milligrams per fluid ounce according to their sweetening power and the regulatory provisions of the country where the beverage is to be marketed. Sweeteners also affect the body or texture of the beverage. Too much sweetener can overpower many flavors while too little yields a beverage that tastes watery and flat, weak, or insipid.

Acid is used in carbonated beverages for several functions. These include lending tartness to taste, enhancing palatability, increasing thirst quenching effect, modifying sweetness and acting as a mild preservative. Phosphoric acid is most commonly used in cola beverages. Other acids in addition to phosphoric acid suitable for use in the beverage of the present invention include citric, malic, tartaric, lactic, formic, ascorbic, hydrochloric, sulfuric, fumaric, and adipic. Preferred for use herein is a phosphoric acid. The acid is used in solution form in an amount of from about 0.01% to about 0.5% by weight of the beverage, preferably from about 0.05% to about 0.25% by weight of the beverage, depending upon the acidulant used. Benzoic acid, sodium benzoate, or other suitable compounds, can be added as a preservative. The level of preservative used is adjusted according to the planned final product pH, as well as an evaluation of the microbiological spoilage potential of the particular beverage medium. The maximum level employed is about 0.05% by weight of the beverage. The pH of the beverage ranges from about 2.0 to about 5.0. The correct amount of acid enhances beverage flavor. Too much acid destroys flavor and results in sourness, while too little can make the beverage taste flat or insipid.

Flavorings suitable for use in the present invention include those complimentary to cola. However, no natural or artificial cola flavoring or kola nut extract is employed. Flavorings can be in the form of an extract, oleresin, juice concentrate, bottler's base, or other forms known in the art. A citrus and spice component are necessary to achieve the taste of cola. Preferred citrus flavors include lemon, lime, or orange. Spice flavors preferred for use herein comprise cassia, cinnamon, clove, ginger, cardamon, or coriander. In addition, it is preferred that vanilla flavor be present. These flavors compliment that of the plum and berry juices to provide a beverage having the taste of a cola but without the various cola negatives as previously stated herein.

The flavoring is preferably in the form of an extract and is prepared by a cold hydroalcoholic extraction process. This process produces essential oil flavor extracts of high clarity and significant organoleptic superiority. This process for producing a flavor extract from essential oils comprises the steps of (a) combining an essential oil or mixture thereof with an extraction solvent comprising from about 45% to about 75% ethanol, from 0% to about 5% of a food-compatible glycol, and from about 25% to about 55% water; (b) storing the mixture at a temperature of at most 45° F. (7° C.) for a period of at least 72 hours, to provide an aqueous flavor extract phase and a terpene phase having a lower density than the aqueous flavor extract phase; and (c) separating the terpene phase from the aqueous flavor phase.

While not intending to be limited by theory, it appears that this process is able to produce superior essential oil extracts because the solubility of undesirable terpene materials in the ethanolic extraction solvent system is reduced at the lower extraction temperatures this process requires. As a result, the extracts of this process are less dependent for quality upon uncontrollable factors such as starting oil composition, and consistently have higher non-terpene:terpene ratios. They deliver, gram for gram, more non-terpene flavor and aroma compounds. These materials, and the relative absence of terpenes are responsible for the consistently fresh, light character of the resulting extracts. The lower levels of highly unsaturated terpenes also contribute to greater oxidative stability for extracts made by this process.

The effects of variation in the parameters of this process can be readily understood. Increasing the ethanol concentration in the extraction solvent increases the solubility of the more lipophilic (terpenic) materials in the solvent and produces a "heavier" extract in terms of flavor. Reducing the ethanol concentration, conversely, reduces the percentage of terpenes in the extract and produces a "lighter" extract.

Similarly, increasing temperature increases the mutual solubility of all the components in the extraction system, resulting in a less selective extraction. Conversely, low temperatures can effectively render the more lipophilic (terpenic) compounds insoluble in the extraction solvent, producing a light, highly refined extract or "cut". Temperatures at 45° F. (7° C.) or below are necessary, and temperatures between 40° F.

(4° C.) and the solidification temperature of the extraction mixture are preferred.

Process times can range from about one hour to about two weeks. However, it has been determined that the extraction process itself is about 90% complete in three days at the temperatures specified herein. Thus, process times greater than about three days are effective primarily to allow more complete separation of the terpene phase from the aqueous phase, providing a "cleaner" cut and to aid in minimizing the need for subsequent filtration. High agitation promotes the extraction part of the process by increasing the terpene phase/aqueous phase interfacial area, but high agitation does not permit the extraction system to separate. Accordingly, the extraction system is permitted to rest after initial agitation to provide a clean separation. Following the resting priod, simple physical separation is all that is required. The separation process can take advantage of the fact that the aqueous phase has a higher density than the terpene phase. The resulting product is the clear flavor extract used in this invention. If desired, the extract can also be filtered through paper, using diatomaceous earth as a filtration aid. This will further reduce the level of terpenes in the extract, with minimal change in the clarity of the extract.

Any convenient food-compatible glycol (i.e., 2-4 carbon diol or triol), such as glycerol or propylene glycol, can be used in the extraction solvent to promote mutual solubility of the components, if desired, at levels of up to about 5% by weight. By "food-compatible" is meant both toxicologically and organoleptically acceptable for the food use contemplated for the flavor extract. The extraction solvent is mixed with the essential oil or mixture of essential oils at a solvent-to-oil ratio of from about 5:1 to about 15:1 by weight. The mixture is a two-phase system wherein the phases will be redistributed. An emulsion can be present at the interface of the two phases. After phase redistribution the aqueous flavor phase and oil phase are separated.

The flavoring can also be used in the form of an emulsion. The emulsion is prepared first by mixing the flavorings together, and then combining the mixture with an emulsifying agent. Flavorings also include juice concentrates as previously defined. An emulsifier which is a water-soluble material such as gum acacia, modified starch, carboxymethylcellulose, gum tragacanth, gum ghatti or other suitable gums is used as the emulsifying agent. The emulsifier comprises from about 5% to about 30% of the mixture of flavorings and emulsifier. Other suitable ingredients, such as acid or a preservative, can be incorporated into the emulsion if desired. A weighting oil, such as brominated vegetable oil, or a suitable clouding agent, can be added if deemed necessary.

The particle size of the oil in the emulsion is then reduced by milling or homogenizing the mixture, employing suitable apparatus known in the art. Because the ability of emulsifying agents to hold oil in suspension is proportional to particle size, emulsions of particles with diameters of about 0.1 to about 3.0 microns are suitable for use in this invention. Preferably, the particles are about 2.0 microns or less in diameter. Most preferred is an emulsion in which substantially all the particles are 1.0 microns or less in diameter. The particle size is reduced by passing the mixture through an homogenizer, colloid mill or turbine-type agitator. Usually one or two passes is sufficient.

The flavor emulsion is combined with the fruit, citrus, or berry juices, acid, and optional sweetener to prepare a beverage syrup or concentrate. The brix of the syrup ranges from about 40° to about 70°, preferably from about 40° to about 50°. The brix is the percent solids per 100 grams of beverage and is commonly determined by means of a refractometer. The concentrate or syrup is diluted with water in specific proportions and then carbonated to prepare a beverage for consumption. Use of a preservative can be avoided if the beverage is pasteurized in its container.

Carbon dioxide is used to provide effervescence to the beverage of the present invention. Any of the techniques and carbonating equipment known in the art for carbonating beverages can be employed. Carbon dioxide enhances beverage taste and appearance and aids in safeguarding beverage purity by inhibiting and destroying objectionable bacteria. The beverage of the present invention has a carbon dioxide level of from about 0.5 to about 6.0 volumes carbon dioxide. One volume of carbon dioxide is defined as the amount of carbon dioxide absorbed by any given quantity of water at 60° F. (16° C.) temperature and atmospheric pressure. A volume of gas occupies the same space as does the water by which it is absorbed. Since there is a definite relationship between taste and carbonation, it is important to maintain the carbonation within the desired range. Preferred for use herein is natural carbonation.

Caffeine can be added to the beverage of the present invention if desired. The amount of caffeine added is determined by the regulatory provisions of the country where the beverage is to be marketed, and typically is at a level of 0.02 percent or less by weight of the beverage. The caffeine must be of a purity acceptable for use in foods and beverages. Caffeine can be natural or synthetic in origin.

The refractometric brix of the final beverage ranges from about 0.1 to about 15, preferably from about 7 to about 13. When artificial sweetener is employed the brix of the beverage of the present invention is usually from about 0.5 to about 7.0. The beverage has a pH of from about 2 to about 5, preferably from about 2 to about 3.5.

It can be appreciated that other specific embodiments of this invention can be devised without departing from the scope and spirit of the invention, and without losing its advantages. Minor ingredients can be reasonably altered or eliminated without departing from the scope of this invention. In particular, carbonated juice-based beverages having the taste of a cola can be prepared with no added color or kola nut extract. Superior flavor can be obtained by use of a cold hydroalcoholic extraction process.

The following examples are specific embodiments of the present invention but are not intended to limit it. All percentages are by weight unless otherwise stated.

EXAMPLE 1

A beverage was prepared according to the following formula:

| Ingredient | Percent by Weight |
|---|---|
| Treated water | 84.75 |
| Sodium benzoate | 0.05 |
| High fructose corn syrup | 12.75 |
| Plum juice concentrate, 68° Brix | 1.46 |
| Cranberry juice concentrate, 50° Brix | 0.20 |
| Apple juice concentrate, 70° Brix | 0.36 |

| Ingredient | Percent by Weight |
| --- | --- |
| Anhydrous citric acid | 0.03 |
| Phosphoric acid | 0.03 |
| Flavoring extracts, including lemon, lime, ginger, vanilla, and spice | 0.37 |

The flavorings were prepared independently using cold hydroalcoholic extraction in a one liter separatory funnel. A mixture of ethanol (95%), glycerine, and water were mixed with slow agitation at ambient temperature for about 15 minutes. The desired flavor oils were mixed together at low agitation. The two mixtures were combined to provide a composition that was about 60% ethanol, 3% glycerine, 30% water, and 7% flavor oils. The resulting mixture was agitated for about 1 hour and permitted to rest for about 3 days at a temperature of about 45° F. A bottom layer comprising clear flavor extract was formed, separated from the top layer. To 800 ml. of distilled water the sodium benzoate was slowly added with continual mixing. The high fructose corn syrup, juice concentrates, acids, and flavor extract mixture were then added to prepare 2 liters of beverage syrup. The syrup refractometer brix was 46.6. One liter of syrup was diluted with 3.73 liters of distilled water. The beverage was carbonated to a level of about 3.5 volumes. The brix of the beverage was 11.0 and the pH was 3.4. The beverage was evaluated by a panel of experts and was found to have the flavor of a cola. The beverage was rose in appearance and was found more attractive by the panelists than the appearance of a typical cola.

EXAMPLE 2

A beverage was prepared according to the following formula:

| Ingredient | Percent by Weight |
| --- | --- |
| Distilled water | 6.71 |
| Phosphoric acid | .05 |
| High fructose corn syrup | 13.07 |
| Plum juice concentrate, 68° Brix | 1.62 |
| Flavoring emulsions, including lemon, lime, tangerine, orange, and grapefruit, | 0.97 |
| Flavoring extract - spice blend | 0.16 |
| Carbonated water | 77.42 |

A beverage syrup was prepared by combining 1568.94 grams of distilled water, 11.02 grams of phosphoric acid, and 3055.25 grams of high fructose corn syrup in a one gallon container. The flavor emulsions were separately prepared and emulsified in an APV Gaulin homogenizer, Model 15M, available from APV Gaulin of Everett, MA. The emulsions were then combined together to form an emulsified flavor system. The spice extract was prepared as in Example 1. To a clean sanitized 10-ounce carbonated beverage bottle was added 61.2 grams of syrup, 3.5 grams of flavor emulsions and extract, 5.0 grams of plum juice concentrate, and 239.1 grams of pre-chilled carbonated water. The bottle was immediately crowned and the contents mixed. The brix of the beverage was 11.0. The beverage was evaluated by a panel of experts and was found to have the flavor of a cola.

EXAMPLE 3

A bottling syrup was prepared according to the following formula:

| Ingredient | Percent by Weight |
| --- | --- |
| Distilled water | 66.81 |
| Sodium benzoate | 0.24 |
| High fructose corn syrup | 24.51 |
| Plum juice concentrate | 7.70 |
| Flavoring extracts, including lime, spice, lemon & orange | 0.60 |
| Aspartame (dry) | 0.14 |

To a clean sanitized 1.0 liter beaker the following were combined to prepare the syrup: 733 grams of distilled water, 2.62 grams sodium benzoate, 268.9 grams high fructose corn syrup, 1.59 grams aspartame, 6.61 grams flavoring extracts, and 84.54 grams of plum juice concentrate. To 12 clean and sanitized 10 fluid ounce beverage bottles was added 59.15 ml of above syrup, and 0.044 ml of a 0.1% weight/volume solution of quassia. To 3 each of the 12 bottles 75% phosphoric acid was added, respectively, in the following amounts, 0.23 grams, 0.17 grams, 0.11 grams, and 0.06 grams. Carbonated distilled water was then added to each to the 10.0 fluid ounce mark and the bottles were crowned. The finished beverage had a refractometric Brix of 5.6, 5.5, 5.2, and 5.6, respectively, and a titratable acidity of 0.19, 0.19, 0.15, and 0.14 grams as anhydrous citric acid per 100 ml of beverage, respectively. Expert organoleptic evaluation of these beverages indicated they tasted like a cola. The degree of likeness to a cola increased according to the increase in acid level.

EXAMPLE 4

A beverage was prepared according to the following formula:

| Ingredient | Percent by Weight |
| --- | --- |
| Distilled water | 6.71 |
| Phosphoric acid | 0.05 |
| High fructose corn syrup | 13.07 |
| Flavoring extracts, including spice, lemon, lime & ginger | 0.40 |
| Plum juice concentrate, 68° Brix | 1.62 |
| Carbonated water | 78.15 |

A beverage syrup was prepared as in Example 2. To a sanitized 10 ounce carbonated beverage bottle, 61.22 grams of the syrup, 1.25 grams of flavoring, 5.0 grams of plum juice concentrate, and 241.3 grams of pre-chilled carbonated water were added. The bottle was immediately crowned and the contents mixed. The refractometric Brix of the beverage was 11.0. An expert flavor panel evaluated the beverage after aging it for 3 days and determined it tasted like a cola.

What is claimed is:

1. A storage-stable carbonated beverage comprising from about 80% to about 99.9% by weight water, from about 0.2% to about 20% by weight fruit, citrus, or berry juice, and minor amounts of acid and flavorings, excluding cola flavoring and kola nut extract, said beverage having the taste of a cola; wherein said juice comprises from about 50% to about 100% plum juice, 0% to about 20% of one or more fruit, citrus or berry juices imparting tartness, and 0% to about 30% of one or more fruit, citrus or berry juices light in color.

2. The beverage of claim 1 wherein said juice comprises at least about 50% plum juice, from about 1% to about 50% of one or more juices selected from the group consisting of prune, date, currant, fig, or raisin, 0% to about 20% of one or more fruit, citrus, or berry juices imparting tartness, and 0% to about 30% of one or more fruit, citrus, or berry juices light in color.

3. The beverage of claim 1 wherein the juices imparting tartness comprise one or more juices selected from the group consisting of cranberry, blueberry, blackberry, raspberry, cherry, currant, fig, date, prune, dewberry, loganberry, boysenberry, strawberry, grape, elderberry, lingonberry, quince, buckthorn, sloe, rowan, gooseberry, pomegranate, or persimmon.

4. The beverage of claim 3 wherein the juices light in color comprise one or more juices selected from the group consisting of apple, pear, pineapple, peach, apricot, lemon, lime, orange, apricot, grapefruit, tangerine, rhubarb, cassis, quince, passionfruit, papaya, mango, guava, litchi, kiwi, mandarin, coconut, or banana.

5. The beverage of claim 1 wherein one or more juices, excluding plum juice, comprise deflavored, decolored juices.

6. The beverage of claim 1 wherein the mixture of juices comprises plum juice, cranberry juice to impart tartness, and apple juice as the juice light in color.

7. The beverage of claim 1 wherein the acid comprises one or more edible acids selected from group consisting of phosphoric, citric, malic, tartaric, lactic, formic, ascorbic, isoascorbic, hydrochloric, sulfuric, fumaric, and adipic.

8. The beverage of claim 7 wherein the acid comprises citric acid provided as lemon or lime juice.

9. The beverage of claim 1 wherein acid is present at a level of from about 0.01% to about 0.5% by weight of the beverage.

10. The beverage of claim 9 having a pH of from about 2 to about 5.

11. The beverage of claim 1 further comprising a sweetener.

12. The beverage of claim 11 wherein the sweetener comprises a natural sweetener or an non-nutritive sweetener.

13. The beverage of claim 12 wherein the natural sweetener is present in an amount of from about 0.1% to about 25% by weight of the beverage.

14. The beverage of claim 12 wherein the non-nutritive sweetener is selected from the group consisting of saccharin, cyclamate, aspartame, other dipeptides, and acesulfame potassium.

15. The beverage of claim 11 having a brix of from about 0.1 to about 15.

16. The beverage of claim 1 having a brix of from about 0.1 to about 15.

17. The beverage of claim 1 which is carbonated at a level of from about 0.5 to about 6.0 volumes of carbon dioxide.

18. The beverage of claim 1 further comprising caffeine.

19. The beverage of claim 1 which is free of added natural or artificial coloring.

20. A storage-stable carbonated beverage comprising:
(a) water in an amount of from about 80% to about 99.9% by weight;
(b) plum juice in an amount of at least 0.2% by weight;
(c) one or more non-plum juices in an amount of at least about 0.0001% by weight;
(d) an edible acid in an amount of at least about 0.01% by weight; and
(e) flavorings in a minor amount excluding cola flavoring;
said beverage having the taste of a cola but free of added coloring, and kola nut extract.

21. The beverage of claim 20 further comprising a sweetener in an amount of from about 0.1% to about 15% by weight.

22. The beverage of claim 20 wherein the mixture of non-plum fruit juices comprises cranberry and apple juice.

23. The beverage of claim 1 further comprising nutrient fortification.

* * * * *